US007916950B2

(12) United States Patent
Ou et al.

(10) Patent No.: US 7,916,950 B2
(45) Date of Patent: Mar. 29, 2011

(54) IMAGE PROCESSING METHOD AND APPARATUS THEREOF

(75) Inventors: Hsin-Ying Ou, Hsin-Chu (TW); Po-Wei Chao, Taipei Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 1050 days.

(21) Appl. No.: 11/685,215

(22) Filed: Mar. 13, 2007

(65) Prior Publication Data

US 2007/0211957 A1    Sep. 13, 2007

(30) Foreign Application Priority Data

Mar. 13, 2006  (TW) ............................... 95108402 A

(51) Int. Cl.
    *G06K 9/62* (2006.01)
    *G06K 9/48* (2006.01)
    *G06K 9/56* (2006.01)
    *G06K 9/40* (2006.01)

(52) U.S. Cl. ........ 382/224; 382/199; 382/205; 382/266; 382/274; 382/275

(58) Field of Classification Search .................. 382/199, 382/205, 224, 254, 260–269, 274, 275
See application file for complete search history.

(56) References Cited

U.S. PATENT DOCUMENTS

| 6,229,578 | B1 | 5/2001 | Acharya | |
|---|---|---|---|---|
| 2004/0183812 | A1* | 9/2004 | Raskar et al. | 345/582 |
| 2005/0100235 | A1* | 5/2005 | Kong et al. | 382/261 |
| 2005/0163380 | A1* | 7/2005 | Wang et al. | 382/199 |
| 2006/0087517 | A1* | 4/2006 | Mojsilovic | 345/593 |
| 2008/0260040 | A1* | 10/2008 | Ouyang et al. | 375/240.24 |

FOREIGN PATENT DOCUMENTS

| TW | 455781 | 9/2001 |
|---|---|---|
| WO | WO 2004027695 A1 * | 4/2004 |

* cited by examiner

*Primary Examiner* — Aaron W Carter
(74) *Attorney, Agent, or Firm* — Winston Hsu; Scott Margo

(57) ABSTRACT

An image processing method is disclosed for processing a first and a second image area of a video frame or a video field. The image processing method includes performing a first operation on the first image area wherein the first operation corresponds to a first criterion, performing a first image processing procedure on the first image area according to the result of the first operation so as to update the first image area, performing a second operation on the second image area wherein the second operation corresponds to a second criterion, and performing a second image processing procedure on the second image area according to the result of the second operation so as to update the second image area.

17 Claims, 3 Drawing Sheets

Fig. 3

IMAGE PROCESSING METHOD AND APPARATUS THEREOF

BACKGROUND OF THE INVENTION

1. Field of the Invention

The invention relates to image processing, and more particularly, to reducing noise of pixels in an image.

2. Description of the Prior Art

Digital images are becoming more and more widely seen as technology advances. In order to improve quality of the digital images, various image processing software and hardware are subsequently proposed and developed. For example, controller chips in the field such as LCD monitors, LCD TVs, and digital TVS, may incorporate many image processing procedures for various types of images, in order to improve quality of digital images.

In general, most of the image processing techniques process images on a whole image, whole video frame, or whole video field basis. In other words, conventional image processing methods perform the same image processing procedure, such as image enhancement, on all pixels in a target image, video frame, or video field. Although most pixels in the target image, frame, or field may be suitable for the adopted image processing procedure, there must inevitably exist a portion of pixels that are not suitable for such a processing procedure. Thus, although the quality of the whole image may be slightly improved, the image quality of certain area comprising said portion of pixels suffers and becomes worse than before.

SUMMARY OF THE INVENTION

It is therefore one of the objectives of the present invention to provide an image processing method and apparatus thereof, to perform a pixel-based classification for a plurality of pixels in an image, and select an optimal image processing procedure according to the classification result for each pixel in the image.

Another objective of the present invention is to provide an image processing method and apparatus thereof, to perform a pixel-based classification or a pixel-area-based classification for a plurality of pixels in an image, and when the pixel or the pixel area is determined as conforming to one type or various types, performing a corresponding image processing procedure or a plurality of corresponding image processing procedures on the pixel or the pixel area.

According to an embodiment of the present invention, an image processing method is disclosed for processing a first and a second image area of a video frame or a video field. The image processing method includes performing a first operation on the first image area according to a first criterion, performing a first image processing procedure on the first image area according to the result of the first operation so as to renew the first image area, performing a second operation on the second image area according to a second criterion, and performing a second image processing procedure on the second image area according to the result of the second operation so as to renew the second image area.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram of determining filters and the processing filters that can be applied in the image processing device as shown in FIG. 1

DETAILED DESCRIPTION

The technologies and principles as described hereinafter in the embodiment of the present invention can be applied in various types of image processing devices, for example, in still image processing devices such as digital still cameras (DSCs), or video systems such as LCD monitors, LCD TVs, or other digital TV systems. People of ordinary in the relevant art, after understanding the operations and principles of the disclosed embodiment of the present invention, will become capable of adapting the inventive method and apparatus into other similar fields of applications. As such, for the purpose of illustration an LCD TV system will be taken as an example in the following description.

Figure 1:
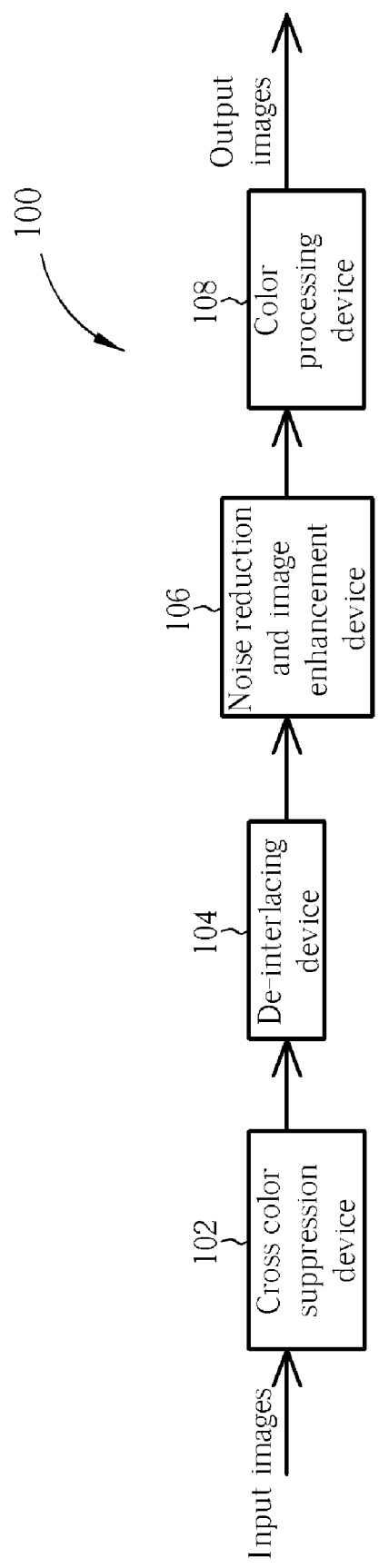
FIG. 1 is a diagram of an image processing device according to an embodiment of the present invention.

Please refer to FIG. 1. FIG. 1 is a diagram of an LCD TV system 100 for processing received video images according to an embodiment of the present invention. In this embodiment, after being processed by a front end (not shown), input video image data received by the TV system 100 will be subsequently processed by a cross color suppression device 102, a de-interlacing device 104, a noise reduction and image enhancement device 106, and a color processing device 108, in order to generate proper output video image data for displaying on an LCD panel. Please note that, although the processing devices of this embodiment as shown in FIG. 1 performs various processing on the input video image according to a specific order, a person of average skill in the pertinent art should understand that this order should not be viewed as a limitation to the present invention. After understanding the operation method and theory of the embodiment of the present invention, a person of average skill in the pertinent art should be able to design and implement a different flow from FIG. 1, for example, performing the image processing operation of the noise reduction and image enhancement device before performing the de-interlacing process, or performing in other order or other image processing steps that are not mentioned herein. In addition, please note that any person who is familiar with electronic circuit design or digital signal process should be able to use all kinds of hardware circuit designing methods or software programming methods to realize the following noise reduction and image enhancement device after understanding the operation theory of the embodiment of the present invention.

Figure 2:
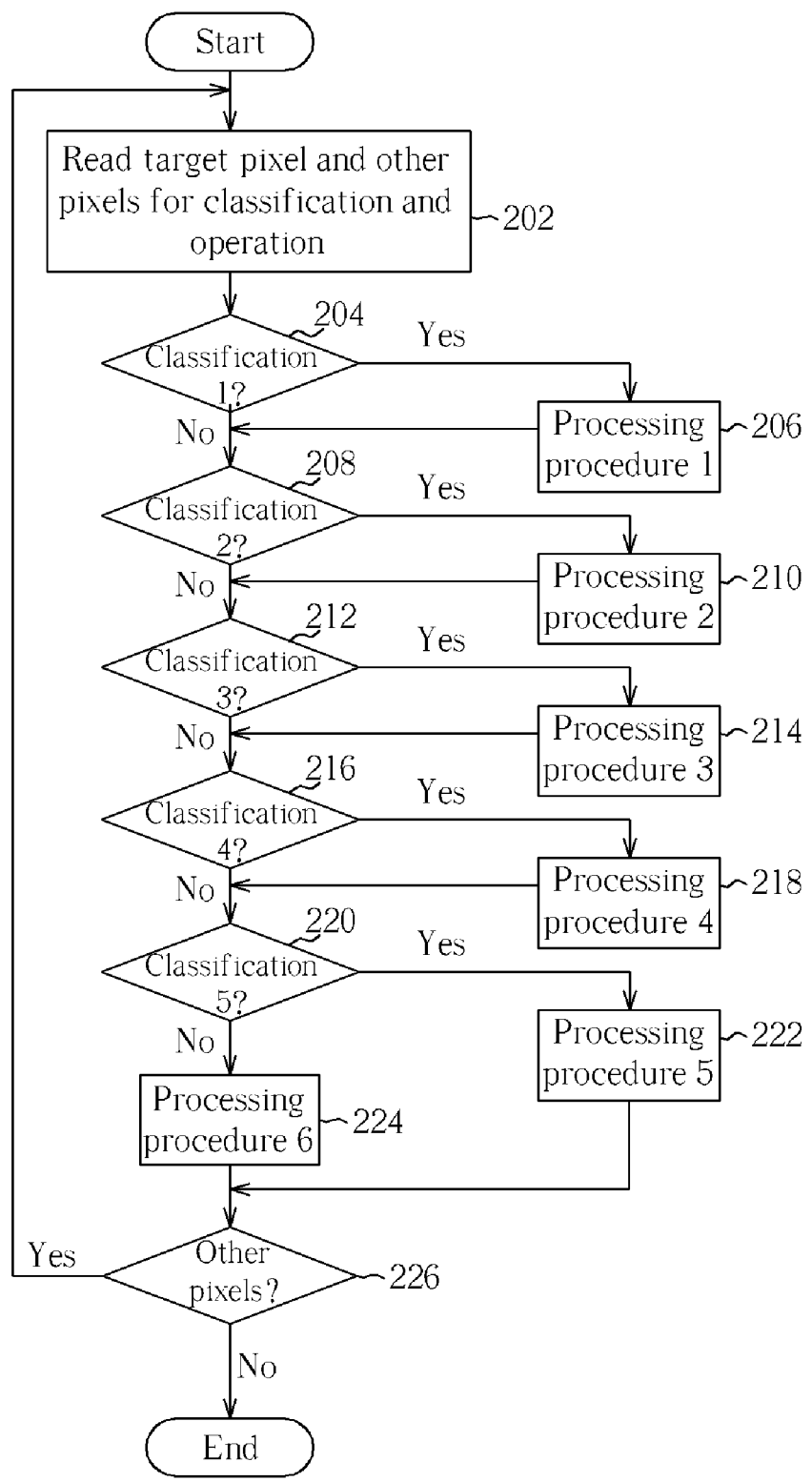
FIG. 2 is a flow chart of an image processing method according to an embodiment of the present invention.

Next, please refer to FIG. 2. FIG. 2 is an image processing flow chart of the noise reduction and image enhancement device 106 as shown in FIG. 1 according to an embodiment of the present invention. In this embodiment, the noise reduction and image enhancement device 106 processes video image data on a pixel-by-pixel basis; that is, the noise reduction and image enhancement device 106 performs the following processing procedure on a current pixel of the video image data. After the current processing procedure is finished, the noise reduction and image enhancement device 106 performs the processing procedure on a next pixel of the video image data, and continues until all the pixels are processed. The flow chart shown in FIG. 2 will now be explained in detail in the following.

For a target pixel to be currently processed, the noise reduction and image enhancement device 106 will read the target pixel as an image processing target, and a plurality of other pixels related to the target pixel, to be utilized for performing classification and image processing operations together with the target pixel (step 202). The read pixels are registered in an internal or external buffer, for example, a line buffer or a frame buffer. In this embodiment, the read pixels other than the target pixel as mentioned above are chosen from the eight pixels positioned in the same video frame (or video field) as, and around and adjacent to the target pixel. As known by those familiar with the image processing techniques, other combinations of a plurality of pixels that are related to the target pixel can also be utilized to perform the following classification and image process.

Figure 3:
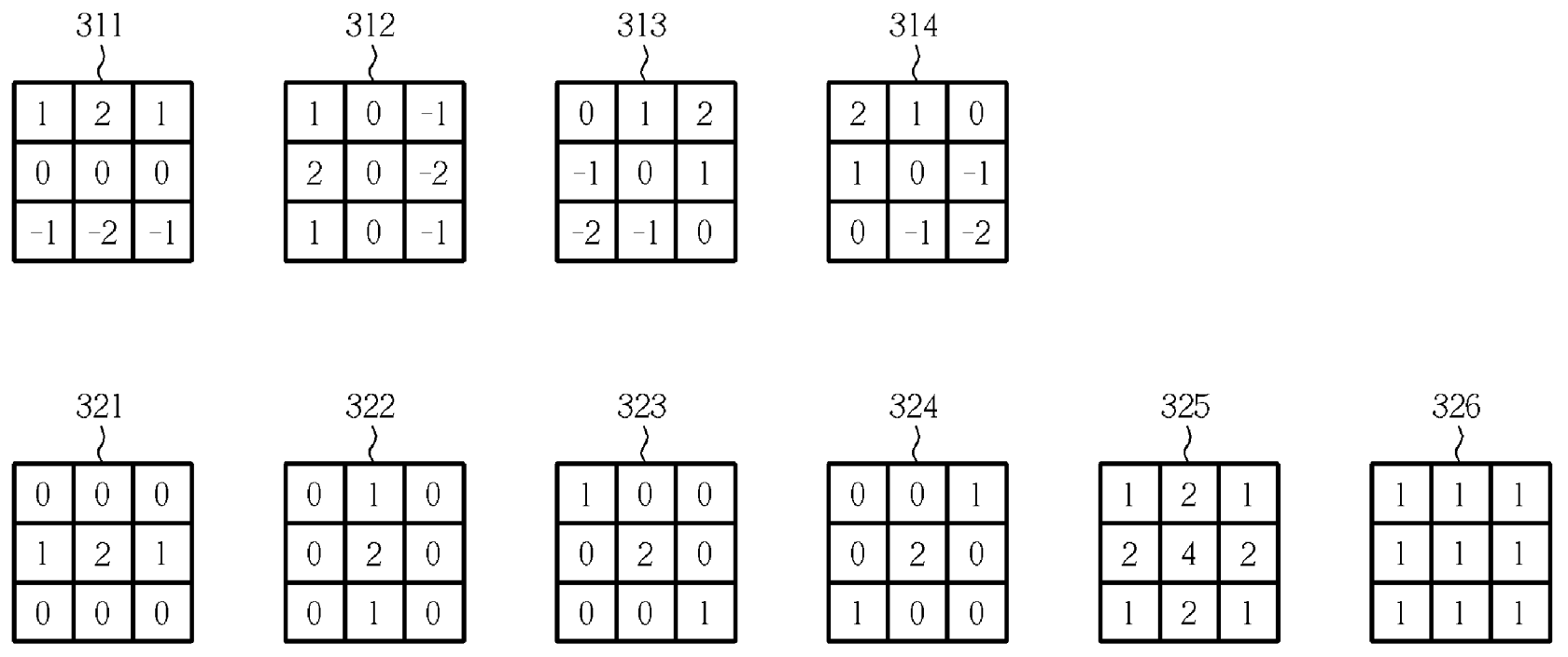

Next, the noise reduction and image enhancement device 106 will utilize the read pixels to perform a first classification, in order to determine whether to perform a first processing procedure on the target pixel (step 204). In this embodiment, the noise reduction and image enhancement device 106 uses a first determining filter 311 shown in FIG. 3 to perform a Sobel filtering operation on the read nine pixels centered at the target pixel, in order to determine whether the image at and around the target pixel exhibits the characteristic of a horizontal edge; that is, an edge detection is performed. If the result of the Sobel filtering operation reveals that the image has the characteristic of a horizontal edge and therefore belongs to a first type, then the noise reduction and image enhancement device 106 will perform the first processing procedure on the nine pixels, updating the value of the target pixel by performing a specific calculation with the values of said pixels (step 206). In this embodiment, the noise reduction and image enhancement device 106 utilizes a first processing filter 321 shown in FIG. 3 to perform a filtering operation on the nine pixels, to attain the effects of noise reduction and/or edge enhancement.

Next, the noise reduction and image enhancement device 106 will perform a second classification on the pixels after the steps mentioned above are performed, in order to determine whether to perform a second processing procedure on the target pixel (step 205). In this embodiment, the noise reduction and image enhancement device 106 utilize a second determining filter 312 shown in FIG. 3 to perform a Sobel filtering operation on the read nine pixels centered at the target pixel after the steps mentioned above are performed, in order to determine whether the image at and around the target pixel exhibits the characteristic of a vertical edge; that is, an edge detection is performed. If the result of the Sobel filtering operation reveals that the image has the characteristic of a vertical edge and therefore belongs to a second type, then the noise reduction and image enhancement device 106 will perform the second processing procedure, to update the value of the target pixel by performing a specific calculation on the values of said pixels (step 210). In this embodiment, the noise reduction and image enhancement device 106 utilizes a second processing filter 322 shown in FIG. 3 to perform a filtering operation on the nine pixels to attain the effects of noise reduction and/or edge enhancement.

Next, the noise reduction and image enhancement device 106 will perform a third classification on the pixels after the steps mentioned above are performed, in order to determine whether to perform a third processing procedure on the target pixel (step 212). In this embodiment, the noise reduction and image enhancement device 106 utilize a third determining filter 313 shown in FIG. 3 to perform a Sobel filtering operation on the read nine pixels centered at the target pixel after the steps mentioned above are performed, in order to determine whether the image at and around the target pixel exhibits the characteristic of a left-tilted edge; that is, an edge detection is performed. If the result of the Sobel filtering operation reveals that the image has the characteristic of a left-tilted edge and therefore belongs to a third type, then the noise reduction and image enhancement device 106 will perform the third processing procedure, to update the value of the target pixel by performing a specific calculation on the values of said pixels (step 214). In this embodiment, the noise reduction and image enhancement device 106 utilizes a third processing filter 323 shown in FIG. 3 to perform a filtering operation on the nine pixels to attain the effects of noise reduction and/or edge enhancement.

Next, the noise reduction and image enhancement device 106 will perform a fourth classification on the pixels after the steps mentioned above are performed, in order to determine whether to perform a fourth processing procedure on the target pixel (step 216). In this embodiment, the noise reduction and image enhancement device 106 utilize a fourth determining filter 314 shown in FIG. 3 to perform a Sobel filtering operation on the read nine pixels centered at the target pixel after the steps mentioned above are performed, in order to determine whether the image at and around the target pixel exhibits the characteristic of a right-tilted edge; that is, an edge detection is performed. If the result of the Sobel filtering operation reveals that the image has the characteristic of a right-tilted edge and therefore belongs to a fourth type, then the noise reduction and image enhancement device 106 will perform the fourth processing procedure, to update the value of the target pixel by performing a specific calculation on the values of said pixels (step 218). In this embodiment, the noise reduction and image enhancement device 106 utilizes a fourth processing filter 324 shown in FIG. 3 to perform a filtering operation on the nine pixels to attain the effects of noise reduction and/or edge enhancement.

Next, the noise reduction and image enhancement device 106 will perform a fifth classification on the pixels after the steps mentioned above are performed, in order to determine whether to perform a fifth or a sixth processing procedure on the target pixel (step 220). In this embodiment, the noise reduction and image enhancement device 106 can utilize a threshold value as a determining standard to determine whether the target pixel value is close to the values of the nearby pixels. If the determining result is positive, then the image at and around the target pixel is classified as a smooth area, and the noise reduction and image enhancement device 106 will perform the fifth processing procedure to update the target pixel value (step 222); otherwise, the image with the target pixel thereon is classified as a disorderly area, and the noise reduction and image enhancement device 106 will perform the sixth processing procedure to update the target pixel value (step 224). In this embodiment, the noise reduction and image enhancement device 106 utilizes a fifth processing filter 325 shown in FIG. 3 to perform the fifth processing procedure on the nine pixels, and the noise reduction and image enhancement device 106 utilizes a sixth processing filter 326 shown in FIG. 3 to perform the sixth processing procedure on the nine pixels. Both the fifth and sixth processing procedures can attain the effect of noise reduction.

After finishing the determining and processing procedures on the target pixel as mentioned above, the noise reduction and image enhancement device 106 will check whether there are other pixels to be processed. If there are other pixels to be processed, then steps 202 through 224 will be repeated, subsequently on said other pixels, and if there are no other pixels to be processed, then the flow will be finished. Please note that the Sobel filtering operation mentioned in the steps 204, 208, 212, and 216 is well known by people familiar with the image processing techniques, and therefore details of its operation theory and steps are herein omitted for the sake of brevity. Those familiar with the related techniques should understand that the filtering operation herein can be realized by using Laplace filters or other well-known filtering techniques. All of the filtering operations as mentioned in the steps 206, 210, 214, 218, 222, and 226 are also well known by those familiar with the relevant art, and therefore details of their operation theory and steps are herein omitted for the sake of brevity.

Furthermore, please note that although the image processes of the noise reduction and image enhancement device 106 in the embodiment mentioned above are pixel-based, the present invention is not so limited. Those familiar with the relevant art should understand that the same operation principles can be used in an image processing system that divides a video frame/video field into a plurality of image areas where each image area respectively includes one or more pixels. In other words, the image processes including the classification and different processing procedures performed in this kind of system are "image-area based", and therefore the advantage of performing different image processing operations in different areas of the same video frame/video field according to the characteristics can be kept with the additional benefit of reducing the required operation capability. In addition, although the embodiment of the present invention mentioned above only illustrates an example of determining whether to perform one or more of the six different types of processing procedures by checking the five classification standards, and only illustrates noise reduction and edge enhancement as the effects of the image processes, the present invention is not limited thereto. People familiar with the image processing techniques should be able to expand the concept of the present invention and adapt it in the applications with more complicated classification standards and processing procedures after understanding the disclosure of this specification.

According to the processing procedures in the embodiment of the present invention mentioned above, different image processing operations can be performed on various pixels or image areas of different positions in the same video frame or video field according to their characteristics so that the video image can be optimally processed, and the instance of part of the image quality being sacrificed due to using the same processing procedure on the whole image will not happen. In addition, since each target pixel or image area will be checked by a plurality of various classification standards, and may experience more than one type of image processing procedure when applicable, the video image can be processed optimally. Unlike the conventional image processing method, which only selects one processing procedure from a plurality of processing procedures to perform image processing, and fails to search out the possibility of further improvement of image quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method for processing an input image, the image processing method comprising:
   performing classification on a plurality of input pixels in the input image, comprising:
      performing a first classification on the input pixels according to a first criterion; and
      performing a second classification on the input pixels according to a second criterion and a result of the first classification; and
   with respect to each of the input pixels, selecting at least a processing procedure according to a classification result of an input pixel, and through the processing procedure, generating an output pixel corresponding to the input pixel, wherein the step of selecting at least a processing procedure according to the classification result of the input pixel comprises:
      determining whether to perform a first processing procedure on the input pixel according to the result of the first classification; and
      determining whether to perform a second processing procedure on the input pixel according to a result of the second classification;
   wherein an output image is composed of a plurality of output pixels corresponding to the input pixels.

2. The method of claim 1, wherein the step of performing classification on the input pixels in the input image comprises:
   determining which type of edge each input pixel belongs to according to the pixel values of said input pixel and nearby pixels of said input pixel.

3. The method of claim 2, wherein the step of performing classification on the input pixels in the input image further comprises:
   if it is determined that each input pixel does not belong to any type of edge, then further determining whether said input pixel belongs to a smooth area or a disorderly area according to the pixel values of said input pixel and nearby pixels of said input pixel.

4. The method of claim 1, wherein the step of selecting a processing procedure according to the classification result of the input pixel comprises:
   if it is determined that the input pixel belongs to a specific type of edge, then using an edge enhancement procedure as the processing procedure to enhance said specific type of edge in the output pixel.

5. The method of claim 4, wherein the step of selecting a processing procedure according to the classification result of the input pixel further comprises:
   if it is determined that the input pixel belong to a smooth area or a disorderly area, then using a noise reduction procedure as the processing procedure.

6. The method of claim 1, wherein the step of performing classification on the input pixels in the input image is only performed according to data included in the input image.

7. An image processing method for processing a first and a second image area of a video frame or a video field, the image processing method comprising:
   performing a first classification on the first image area, the first classification corresponding to a first criterion;
   performing a first image processing procedure on the first image area according to a result of the first classification so as to update the first image area;
   performing a second classification on the second image area, the second classification corresponding to a second criterion;
   performing a second image processing procedure on the second image area according to a result of the second classification so as to update the second image area;
   performing a third classification on the first image area, the third classification corresponding to the second criterion; and
   performing the second image processing procedure on the first image area according to a result of the third classification so as to update the first image area.

8. The image processing method of claim 7, wherein the first criterion determines whether an edge exists in the first image area.

9. The image processing method of claim 8, wherein the first classification comprises a Sobel filtering operation.

10. The image processing method of claim 8, wherein the first classification comprises a Laplace filtering operation.

11. The image processing method of claim 7, wherein the first image processing procedure comprises a filtering operation.

12. The image processing method of claim 11, wherein the first image processing procedure is utilized for performing an edge enhancement procedure.

13. The image processing method of claim 7, wherein the second image processing procedure comprises a filtering operation to reduce noise effect.

14. The image processing method of claim 7, wherein the first image area is a first pixel, and the second image area is a second pixel.

15. The image processing method of claim 14, wherein the first operation is a specific operation on a value of the first pixel and values of a plurality of pixels in the vicinity of the first pixel.

16. The image processing method of claim 14, wherein the first image processing procedure is a specific operation on a value of the first pixel and values of a plurality of pixels in the vicinity of the first pixel.

17. The image processing method of claim 7, wherein the first image area comprises a plurality of pixels, and the second image area comprises a plurality of pixels.

* * * * *